US012266871B2

(12) United States Patent
Mu et al.

(10) Patent No.: US 12,266,871 B2
(45) Date of Patent: Apr. 1, 2025

(54) COMPACT ANTENNA DESIGN

(71) Applicant: ZEBRA TECHNOLOGIES CORPORATION, Lincolnshire, IL (US)

(72) Inventors: Wei-Yu Mu, Taipei (TW); Prince Wang, Taipei (TW); N. F. Casazzone, Dix Hills, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 310 days.

(21) Appl. No.: 17/992,426

(22) Filed: Nov. 22, 2022

(65) Prior Publication Data

US 2024/0170848 A1 May 23, 2024

(51) Int. Cl.

*H01Q 9/04* (2006.01)
*H01Q 5/25* (2015.01)
*H01Q 21/24* (2006.01)

(52) U.S. Cl.

CPC ............ *H01Q 9/0421* (2013.01); *H01Q 5/25* (2015.01); *H01Q 9/0442* (2013.01); *H01Q 21/24* (2013.01)

(58) Field of Classification Search

CPC ...... H01Q 5/25; H01Q 9/0421; H01Q 9/0442; H01Q 21/24

See application file for complete search history.

(56) References Cited

U.S. PATENT DOCUMENTS

2021/0328346 A1* 10/2021 Zhang .................... H01Q 7/00

* cited by examiner

*Primary Examiner* — Jimmy T Vu

(57) ABSTRACT

A compact antenna design is provide with a carrier arm having a first end and a second end; a resonating arm, connected at the second end of the carrier arm and extending perpendicularly from the carrier arm in a first direction; a capacitive tuning arm, having a third end and a fourth end, connected at the third end to a portion of the carrier arm between to the first end and the second end, and extending perpendicularly from the carrier arm in the first direction; and a shorting arm, connected at the fourth end of the capacitive tuning arm and extending perpendicularly from the capacitive tuning arm in a second direction, away from the resonating arm.

20 Claims, 6 Drawing Sheets

COMPACT ANTENNA DESIGN

BACKGROUND

A wireless computing device may include various antennas to send and receive wireless signals. These antennas are tuned to the various channels and transmission bands for certain wireless signaling standards, and fitting the antennas within a predefined form factor for a wireless computing device may introduce various design challenges based on the size of the antennas and other components included in the wireless computing device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
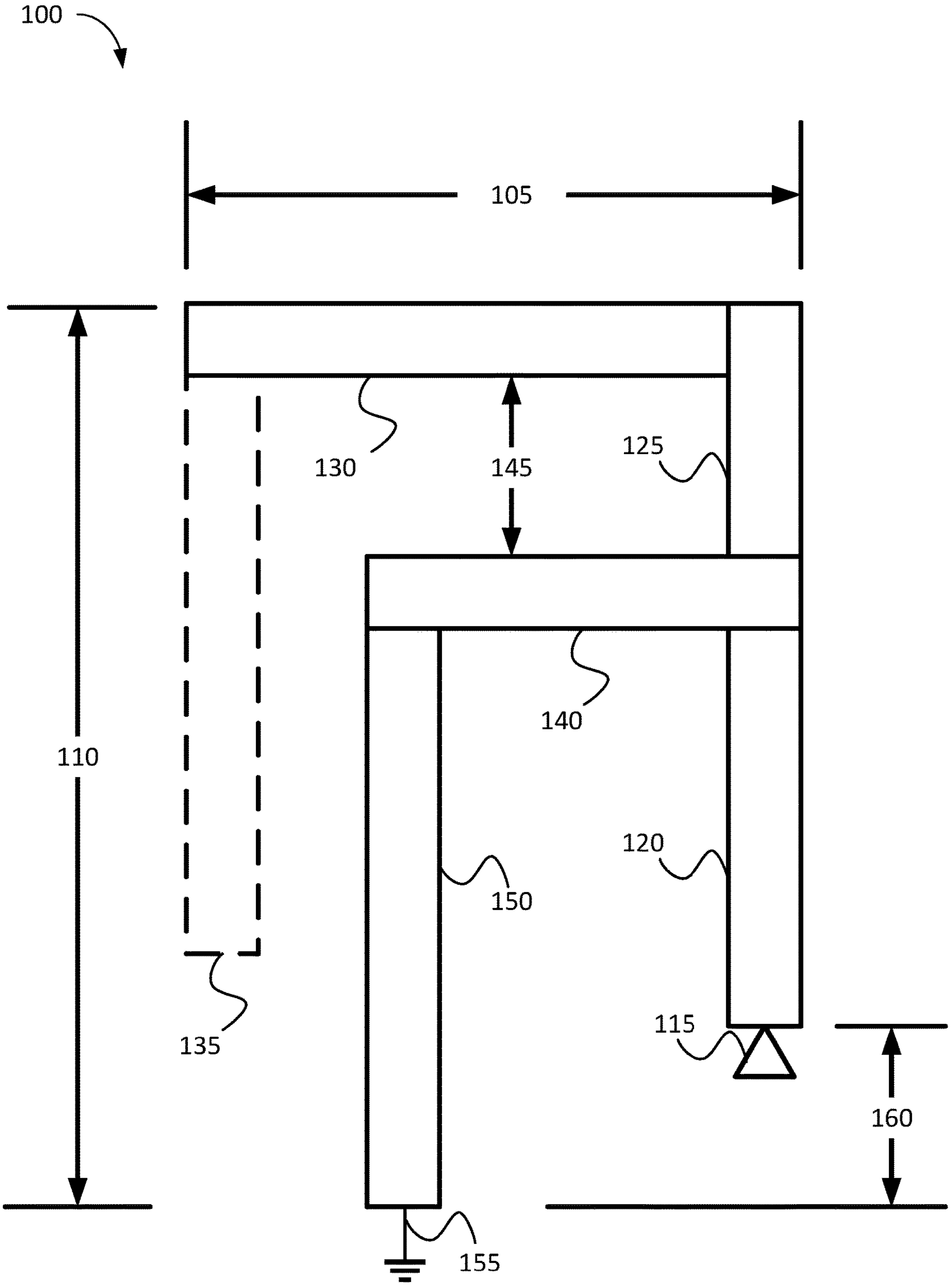
FIG. 1 illustrates a bent inverted-F antenna design, according to embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present disclosure provides for compact antennas with improved footprints for inclusion in space-constrained devices and with additional features for tuning the antennas for certain channels and transmission bands. The design introduces a capacitive tuning arm that interacts with the resonating arm via a parasitic capacitance between the arms that a designer can optimize (in addition to the trace lengths of the various arms) via a distance between the arms to tune the antenna for transmission or reception of a desired range of frequencies of wireless signals. Additionally, the physical orientation of the traces of the described design offers a smaller footprint compared to similarly tuned inverted-F antenna (WA) designs tuned to the same frequencies, thereby improving the ability to place the presently described antenna in compact spaces. In various embodiments, the described antenna designs can be used in Ultra Wideband (UWB) scenarios for use with indoor location technologies, with high efficiency (e.g., 60%) with strong isolation (e.g., better than −12 decibels (dB) between antennas.

One example disclosed herein is directed to an antenna, comprising: a carrier arm having a first end and a second end; a resonating arm, connected at the second end of the carrier arm and extending perpendicularly from the carrier arm in a first direction; a capacitive tuning arm, having a third end and a fourth end, connected at the third end to a portion of the carrier arm between to the first end and the second end, and extending perpendicularly from the carrier arm in the first direction; and a shorting arm, connected at the fourth end of the capacitive tuning arm and extending perpendicularly from the capacitive tuning arm in a second direction, away from the resonating arm.

In some embodiments, the second end and the fourth end include chamfered edges.

In some embodiments, the resonating arm extends in the first direction past the fourth end of the capacitive tuning arm.

In some embodiments, the antenna further comprises a resonating extension arm, extending in the second direction perpendicularly from a second end of the resonating arm not connected to the carrier arm.

In some embodiments, a gap distance in the second direction from the resonating arm to the capacitive tuning arm is tuned for a parasitic capacitance in the antenna.

In some embodiments, a length of the resonating arm is tuned for at least one of transmission or reception of signals with frequencies between 6.2 Gigahertz (GHz) and 9 GHz.

In some embodiments, an area occupied by the antenna is less than 3.1 millimeters (mm) by 3.8 mm.

One example disclosed herein is directed to an antenna, comprising: a resonating arm having a first end and a second end, opposite to the first end, and wherein the resonating arm is aligned in a first direction; a capacitive tuning arm configured to impart a parasitic capacitance in the antenna, wherein the capacitive tuning arm has a first end and a second end, opposite to the first end, and wherein the capacitive tuning al in is aligned in the first direction at a gap distance from the resonating arm; a gap arm aligned in a second direction perpendicular to the first direction, wherein the gap arm is connected to the second end of the resonating arm and to the second end of the capacitive tuning arm; an signal arm aligned in the second direction, wherein the signal arm has a first end and a second end, opposite to the first end, and wherein the second end of the signal arm is connected to the second end of the capacitive tuning am and the first end of the input am is connected to a signal input; and a shorting arm aligned in the second direction, wherein the shorting arm has a first end and a second end, opposite to the first end, and wherein the first end of the shorting arm is connected to the first end of the capacitive tuning arm and the second end of the shorting arm is connected to a ground.

In some embodiments, the second end of the resonating arm and the second end of the capacitive tuning arm include chamfered edges.

In some embodiments, the first end of the resonating arm extends in the first direction past the first end of the capacitive tuning arm.

In some embodiments, the antenna further comprises a resonating extension arm, aligned in the second direction from the first end of the resonating arm, wherein a combined length of the resonating extension arm and the resonating arm is tuned to send or receive ultra wideband (UWB) signals.

In some embodiments, the gap distance is tuned for a parasitic capacitance in the antenna.

In some embodiments, a length of the resonating arm is tuned to send or receive ultra wideband (UWB) signals.

In some embodiments, an area occupied by the antenna is less than millimeters (mm) by 3.8 mm.

One example disclosed herein is directed to an antenna array, comprising: a printed circuit board (PCB); and a plurality of bent inverted-F antennas connected to the PCB, wherein each bent inverted-F antenna of the plurality of bent inverted-F antennas comprises: a shorting arm connected to the PCB on a first end and a capacitive tuning arm on a second end, the capacitive tuning arm aligned parallel to an edge of the PCB; and a carrier arm connected to a signal input on a first end, to a resonating arm on a second end, and to the capacitive tuning arm at a section between the first end and the second end.

In some embodiments, each bent inverted-F antenna of the plurality of bent inverted-F antennas further comprises: a feed gap between the edge of the PCB and the second end of the carrier arm.

In some embodiments, a length of the resonating arm of each bent inverted-F antenna of the plurality of bent inverted-F antennas is tuned for at least one of transmission or reception of signals with frequencies between 6.2 Gigahertz (GHz) and 9 GHz.

In some embodiments, the plurality of bent inverted-F antennas further comprises four bent inverted-F antennas; a first pair of the four bent inverted-F antennas are disposed on a first edge of the PCB and a second pair of the four bent inverted-F antennas are disposed on a second edge of the PCB, opposite to the first edge; and a free end of the resonating arm of each bent inverted-F antenna of the plurality of bent inverted-F antennas faces the free end of the resonating arm of one other bent inverted-F antenna of the plurality of bent inverted-F antennas.

In some embodiments, each bent inverted-F antenna of the plurality of bent inverted-F antennas further comprises: a resonating extension arm connected to an opposite end of the resonating arm from where the resonating arm is connected to the carrier arm, wherein the resonating extension arm extend from the resonating arm towards the edge of the PCB.

In some embodiments, each bent inverted-F antenna of the plurality of bent inverted-F antennas is tuned for signal reception or transmission according to a length of the resonating arm and a gap distance between the resonating arm and the capacitive tuning arm.

FIG. 1 illustrates a bent IFA design 100, according to embodiments of the present disclosure. The bent IFA design 100 occupies an area having a width 105 and a height 110 that is smaller in overall area than traditional IFA designs by dividing the transmitting/receiving arm into several traces that are "bent" backward onto themselves compared to the traditional IFA design. Although one of ordinary skill in the art will recognize that the lengths of the arms may be varied to tune the bent IFA design 100 to send or receive signals of various frequencies, as a non-limiting example, when tuned for transmission or reception of UWB signals between 6.2 Gigahertz (GHz) and 9 GHz, the width 105 may be approximately (e.g., ±10%) 2.95 millimeters (mm) and the height 110 may be approximately (e.g., ±10%) 3.55 mm, for a total area of approximately 8.48-12.67 $mm^2$. In some embodiments, the total area occupied by the bent IFA design 100 less than 3.1 mm by 3.8 mm.

In various embodiments, each of the described arms are traces of a conductive metal, such as copper, silver, gold, aluminum, and alloys thereof, having a thickness (referring to a dimension into or out of the page for the illustrated example) of approximately (e.g., ±10%) 0.04 millimeters when deployed in a low-profile antenna design.

A shorting arm 150 is connected on a first side to ground 155 and on a second side to the capacitive tuning arm 140, which extends in a first direction from the shorting arm 150 to connect to a carrier arm. The carrier arm can be divided into two portions: a signal arm 120 that extends downward (e.g., towards a ground plane) from the capacitive tuning arm 140 and a gap arm 125 that extends upward (e.g., away from a ground plane) from the capacitive tuning arm 140. The signal arm 120 is connected on one side to the capacitive tuning arm 140 and on an opposite side to a signal input 115. Similarly, the gap arm 125 is connected on one side to the capacitive tuning arm 140 and on an opposite side to the resonating arm 130, which extends from the gap arm 125 in the opposite direction that the capacitive tuning arm 140 extends from the shorting arm 150.

The capacitive tuning arm 140 is separated from the resonating arm 130 by a gap distance 145, which can be tuned by a designer (e.g., by changing the length of the gap arm 125) to alter a value of a parasitic capacitance imparted between the capacitive tuning arm 140 and the resonating arm 130, while the length of the shorting arm 150 can be tuned to control the impedance of the bent IFA design 100. Generally, decreasing the gap distance 145 increases the effective capacitance and reduces the effective impedance of the bent IFA design 100. Additionally or alternatively, a designer can after the length of the capacitive tuning arm 140 (e.g., the distance between the carrier arm and the shorting arm 150) to tune the inductance and capacitance of the bent UFA design 100 without affecting the overall area occupied by the bent IFA design 100. In addition to tuning the gap distance 145 and the length of the capacitive tuning arm 140 to control the capacitance and inductance of the bent IFA design 100, a designer can tune the length of the resonating arm 130 (and, if included, the resonating extension arm 135) to tune the bent IFA design 100 to transmit or receive various frequencies of signals. These tuning operations will be understood by one of ordinary skill in the art as part of a design process for deploying the described bent IFA design 100 for specified use cases of such antennas.

The length of the resonating arm 130 defines the width 105 of the bent IFA design 100, and the combined lengths of the shorting arm 150 and gap arm 125 define the height 110 of the IFA design. In some embodiments, a resonating extension arm 135 is included, which extends from the end of the resonating arm 130 not connected to the gap arm 125 towards the ground plane. The signal arm 120 is separated from the grounding plane by a feed gap 160 and (when included), the resonating extension arm 135 is separated from the grounding plane by at least the feed gap 160.

Figure 2:
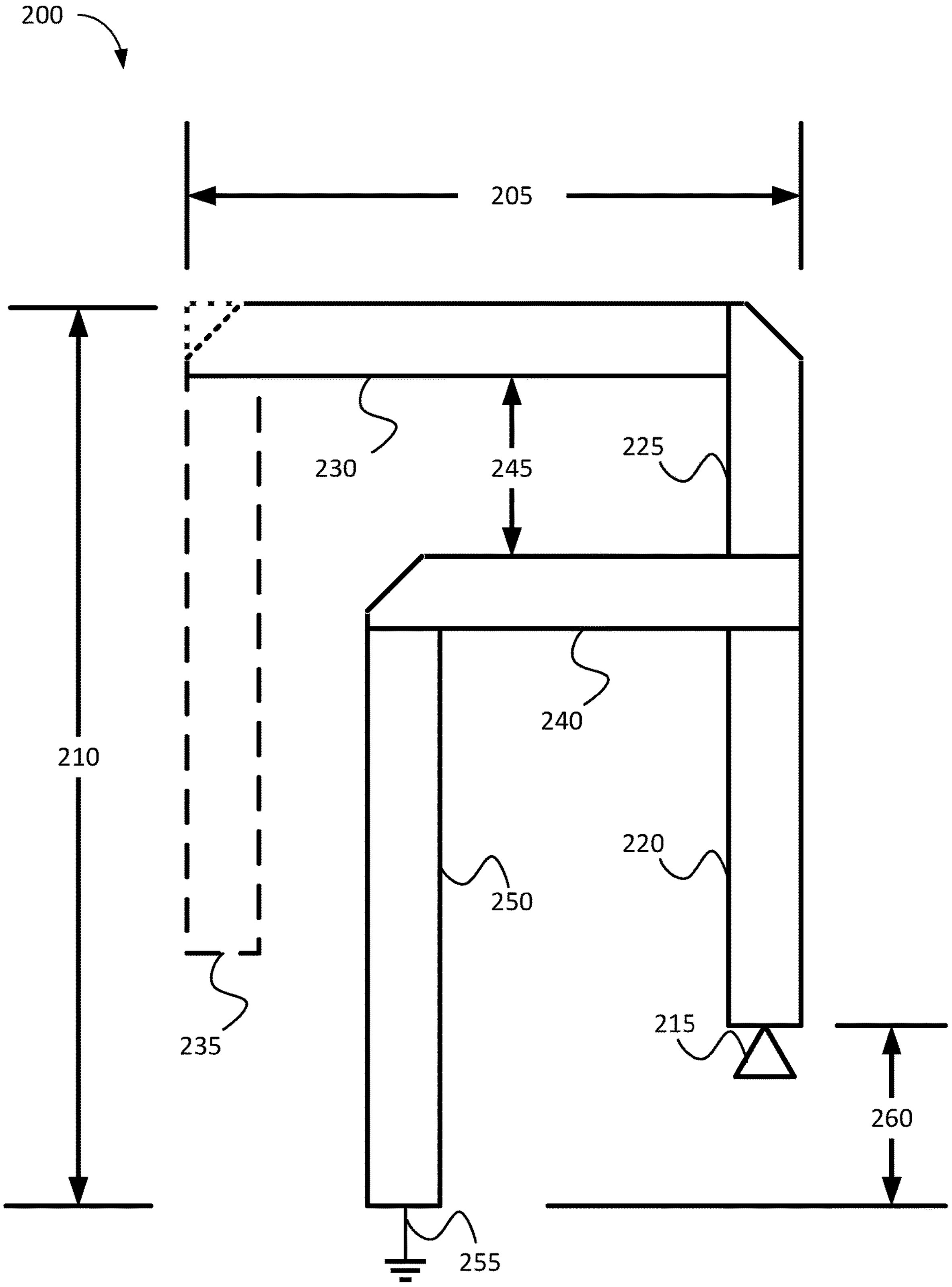
FIG. 2 illustrates a bent inverted-F antenna design with chamfered edges, according to embodiments of the present disclosure.

FIG. 2 illustrates a bent IFA design 200 with chamfered edges, according to embodiments of the present disclosure. Similarly, to the bent IFA design 100 discussed in greater detail in relation to FIG. 1, the bent IFA design 200 in FIG. 2 occupies an area having a width 205 and a height 210 that is smaller in overall area than traditional IFA designs by dividing the transmitting/receiving arm into several traces that are "bent" backward onto themselves compared to the traditional IFA design. Although one of ordinary skill in the art will recognize that the lengths of the arms may be varied to tune the bent IFA design 200 to send or receive signals of various frequencies, as a non-limiting example, when tuned for transmission or reception of UWB signals between 6.2 Gigahertz (GHz) and 9 GHz, the width 205 may be approximately (e.g., ±10%) 2.95 millimeters (mm) and the height 210 may be approximately (e.g., ±10%) 3.55 mm, for a total area of approximately 8.48-12.67 $mm^2$.

In various embodiments, each of the described arms are traces of a conductive metal, such as copper, silver, gold, aluminum, and alloys thereof, having a thickness (referring to a dimension into or out of the page for the illustrated example) of approximately (e.g., ±10%) 0.04 millimeters when deployed in a low-profile antenna design.

A shorting arm 250 is connected on a first side to ground 255 and on a second side to the capacitive tuning arm 240, which extends in a first direction from the shorting arm 250 to connect to a carrier arm. In various embodiments, the connection between the shorting arm 250 and the capacitive tuning arm 240 may include a chamfered edge, in contrast to a straight edge as between the shorting arm 150 and capacitive tuning arm 140 shown in FIG. 1, so that the two arms are joined at a non-normal angle relative to the respective lengths of the arms. For example, as shown in FIG. 2, the chamfered edge between the shorting arm 250 and the capacitive tuning arm 240 is approximately 45 degrees relative to the lengths of the arms, whereas the shorting arm 150 and the capacitive tuning arm 140 shown in FIG. 1 are joined at a 90 degree angle relative to the lengths of the arms. Although illustrated with a 45 slant between the two arms, in various embodiments, the chamfered edges may have other angles (e.g., 60/30, 70/20, 75/15, etc. degrees).

The carrier arm can be divided into two portions: a signal arm 220 that extends downward (e.g., towards a ground plane) from the capacitive tuning arm 240 and a gap arm 225 that extends upward (e.g., away from a ground plane) from the capacitive tuning arm 240. The signal arm 220 is connected on one side to the capacitive tuning arm 240 and on an opposite side to a signal input 215. Similarly, the gap arm 225 is connected on one side to the capacitive tuning arm 240 and on an opposite side to the resonating arm 230, which extends from the gap 225 in the opposite direction that the capacitive tuning arm 240 extends from the shorting arm 250. In various embodiments, the connection between the gap arm 225 and the resonating arm 230 may include a chamfered edge, in contrast to a straight edge as between the gap arm 125 and resonating arm 130 shown in FIG. 1, so that the two arms are joined at a non-normal angle relative to the respective lengths of the arms. For example, as shown in FIG. 2, the chamfered edge between the gap arm 225 and the resonating arm 230 is approximately 45 degrees relative to the lengths of the arms, whereas the gap arm 125 and the resonating arm 130 shown in FIG. 1 are joined at a 90 degree angle relative to the lengths of the arms. Although illustrated with a 45 slant between the two arms, in various embodiments, the chamfered edges may have other angles (e.g., 60/30, 70/20, 75/15, etc.).

In some embodiments, a resonating extension arm 235 is included, which extends from the end of the resonating arm 230 not connected to the gap arm 225 towards the ground plane. The signal arm 220 is separated from the grounding plane by a feed gap 260 and (when included), the resonating extension arm 235 is separated from the grounding plane by at least the feed gap 260. In various embodiments, the connection between the resonating extension arm 235 and the resonating arm 230 may include a chamfered edge, in contrast to a straight edge as between the resonating extension arm 135 and resonating arm 130 shown in FIG. 1, so that the two arms are joined at a non-normal angle relative to the respective lengths of the arms. For example, as shown in FIG. 2, the chamfered edge between the resonating extension arm 235 and the resonating arm 230 is approximately 45 degrees relative to the lengths of the arms, whereas the resonating extension arm 135 and the resonating arm 130 shown in FIG. 1 are joined at a 90 degree angle relative to the lengths of the arms, Although illustrated with a 45 slant between the two arms, in various embodiments, the chamfered edges may have other angles (e.g., 60/30, 70/20, 75/15, etc.).

The capacitive tuning arm 240 is separated from the resonating arm 230 by a gap distance 245, which can be tuned by a designer (e.g., by changing the length of the gap arm 225) to alter a value of a parasitic capacitance imparted between the capacitive tuning arm 240 and the resonating arm 230, while the length of the shorting arm 250 can be tuned to control the impedance of the bent IFA design 200. Generally, decreasing the gap distance 245 increases the effective capacitance and reduces the effective impedance of the bent IFA design 200. Additionally or alternatively, a designer can alter the length of the capacitive tuning arm 240 (e.g., the distance between the carrier arm and the shorting arm 250) to tune the inductance and capacitance of the bent IFA design 200 without affecting the overall area occupied by the bent IFA design 200. In addition to tuning the gap distance 245 and the length of the capacitive tuning arm 240 to control the capacitance and inductance of the bent IFA design 200, a designer can tune the length of the resonating arm 230 (and, if included, the resonating extension arm 235 pcb 34) to tune the bent IFA design 200 to transmit or receive various frequencies of signals. These tuning operations will be understood by one of ordinary skill in the art as part of a design process for deploying the described bent IFA design 200 for specified use cases of such antennas.

The length of the resonating arm 230 defines the width 205 of the bent IFA design 200, and the combined lengths of the shorting arm 250 and gap arm 225 define the height 210 of the IFA design. In various embodiments, the use of chamfered edges at the points of inflection in the bent IFA design 200 allows the designer to place other elements (e.g., additional antennas, circuit traces, etc.) more efficiently around the traces of the bent IFA design 200 while maintaining a predefined distance from the edges of the traces.

Figure 3A:
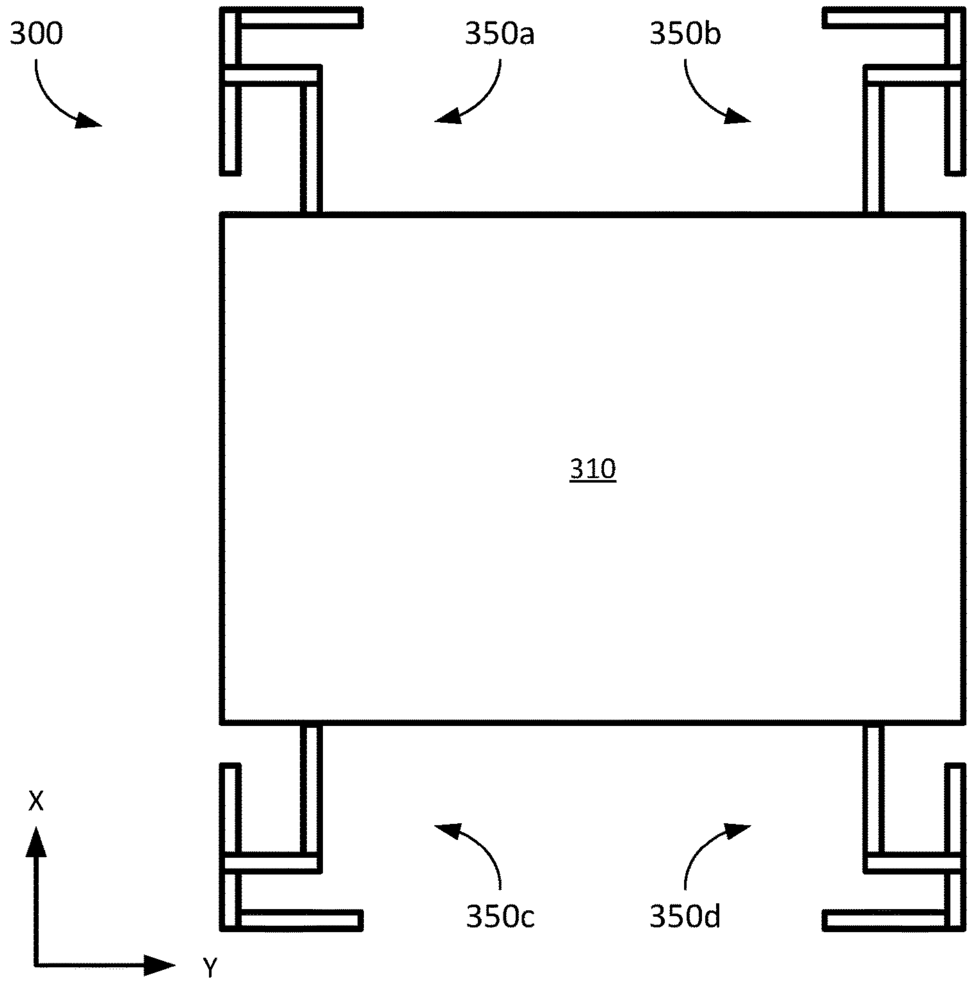
FIGS. 3A and 3B provide planar views of an antenna array with four bent inverted-F antennas, according to embodiments of the present disclosure.
Figure 3B:
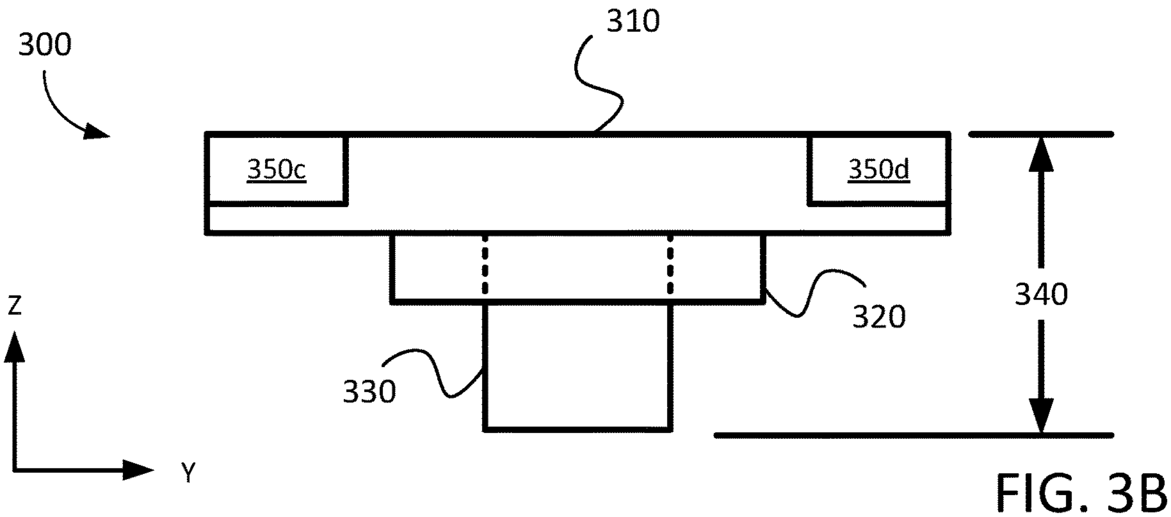

FIGS. 3A and 3B provide planar views of an antenna array 300 with four bent inverted-F antennas 350*a-c*, according to embodiments of the present disclosure. FIG. 3A shows a view in an XY plane, while FIG. 3B shows a view in a ZY plane. Although the antennas 350*a-d* shown in FIGS. 3A and 3B are shown according to the bent IFA design 100 shown in FIG. 1, in various embodiments, the antennas 350*a-d* may also include one or more chamfered edges, as are shown in the bent IFA design 200 shown in FIG. 2. Each of the antennas 350*a-d* shown in FIGS. 3A and 3B are identical (within manufacturing tolerances) to one another, and are controlled via a printed circuit board (PCB) 310 connected as the ground (155) for the antennas 350*a-d.*

The PCB 310 and antennas 350*a-d* provide a low-profile design, with a total depth 340 that is controlled to allow the array 300 to be readily incorporated into various wireless computing devices for use with various standards of wireless communication. In various embodiments, the antennas 350*a-d* may be incorporated into a shared substrate with the PCB 310, or may extend from the PCB 310 into open space.

The PCB 310 includes various electromagnetic shielding 320, and various connectors 330 to connect external power, ground, and control signals to the PCB 310, and secure the PCB 310 in place (in addition to or instead of additional fasteners). In some embodiments, the low-profile design can provide a total depth 340 of less than 4 mm so that the total volume occupied by the array 300 is less than a 27×15×4 mm volume.

The antennas 350*a-d* of the array 300 are provided in a mirrored arrangement around the PCB 310 in which the shorting arm 150 is connected to the PCB 310 on a first end and is connected to a capacitive tuning arm 140 on a second end such that the capacitive tuning arm 140 aligned parallel to an edge of the PCB 310. Each of the antennas 350*a-d* is arranged such that the signal input 115 is on an outer edge of the array 300. Additionally, in the mirrored arrangement, each antenna 350*a-d* includes a carrier arm that is connected to a signal input 115 on a first end, to a resonating arm 130 on a second end, and to the capacitive tuning arm 140 at a section between the first end and the second end such that the antennas connected to the same edge of the PCB 310 (e.g., the first antenna 350*a* and the second antenna 350*b* versus the third antenna 350*c* and the fourth antenna 350*d*) are oriented to face the free end of the resonating arm 130 (e.g., the end not connected to the carrier arm) both towards and in-line with each other. The second end of the carrier arm (that is connected to the signal input 115) is closer to the edge of the PCB 310 than the first end, and is separated from that edge by a feed gap 160. In the mirrored arrangement, the second end of the carrier arm is oriented to face and be in-line with the second end of the carrier arm of one of the antennas 350*a-d* connected to the opposite edge of the PCB 310 (e.g., the first antenna 350*a* and the third antenna 350*c* versus the second antenna 350*b* and the fourth antenna 350*d*).

Figure 4A:
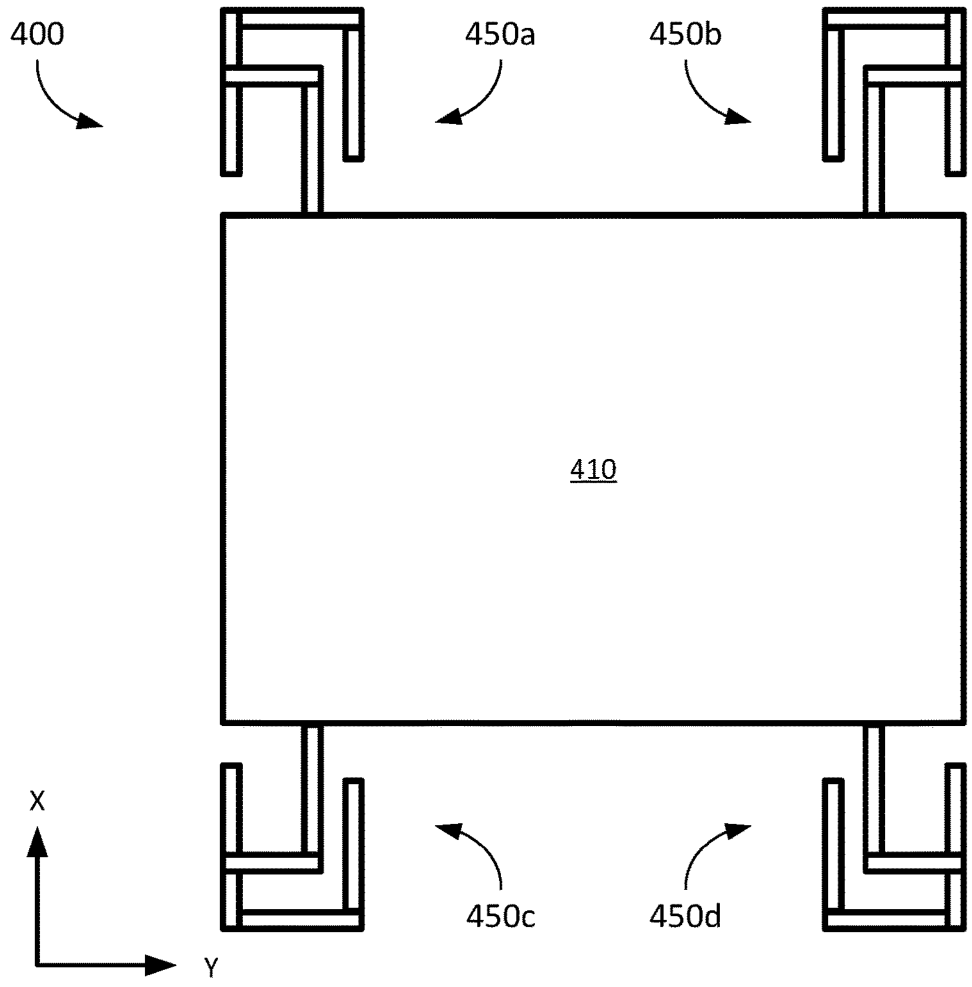
FIGS. 4A and 4B provide planar views of an antenna array with four bent inverted-F antennas with extension arms, according to embodiments of the present disclosure.
Figure 4B:
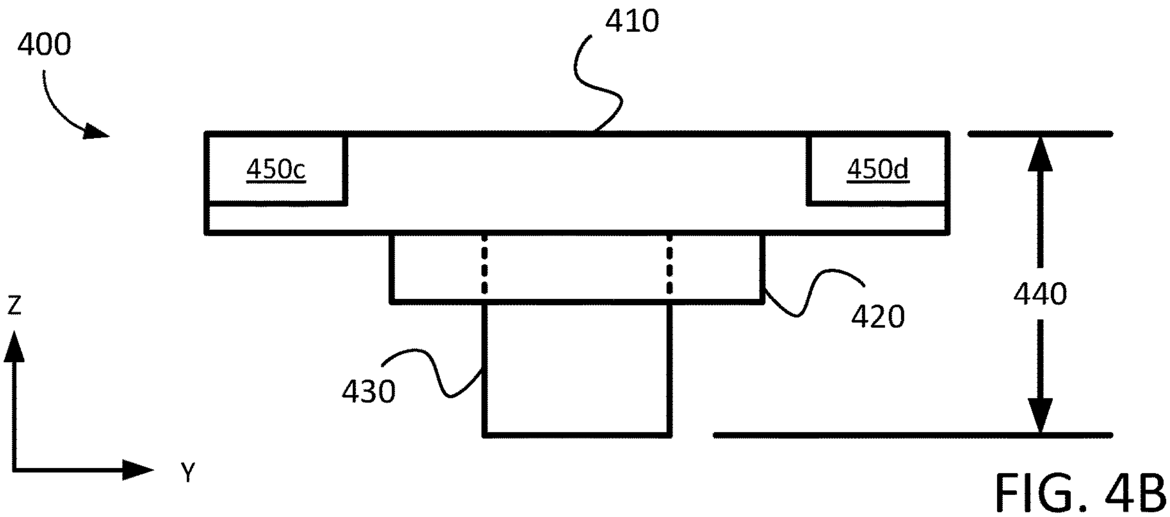

FIGS. 4A and 4B provide planar views of an antenna array 400 with four bent inverted-F antennas 450*a-d* with extension aims, according to embodiments of the present disclosure. FIG. 4A shows a view in an XY plane, while FIG. 4B shows a view in a 2Y plane. Although the antennas 450*a-d* shown in FIGS. 3A and 3B are shown according to the bent IFA design 100 shown in FIG. 1, in various embodiments, the antennas 450*a-d* may also include one or more chamfered edges, as are shown in the bent IFA design 200 shown in FIG. 2. Additionally, each of the antennas 450*a-d* shown in FIGS. 4A and 4B are identical (within manufacturing tolerances) to one another, and are controlled via a printed circuit board (PCB) 310 connected as the ground 155 for the antennas 450*a-d.*

The PCB 410 and antennas 450 provide a low-profile design, with a total depth 440 that is controlled to allow the array 400 to be readily incorporated into various wireless computing devices for use with various standards of wireless communication. In various embodiments, the antennas 450*a-d* may be incorporated into a shared substrate with the PCB 410, or may extend from the PCB 410 into open space. The PCB 410 includes various electromagnetic shielding 420, and various connectors 430 to connect external power, ground, and control signals to the PCB 410, and secure the PCB 410 in place (in addition to or instead of additional fasteners). In some embodiments, the low-profile design can provide a total depth 440 of less than 4 mm so that the total volume occupied by the array 400 is less than a 27×15×4 mm volume.

The antennas 450*a-d* of the array 400 are provided in a mirrored arrangement around the PCB 410 in which the shorting arm 150 is connected to the PCB 410 on a first end and is connected to a capacitive tuning arm 140 on a second end such that the capacitive tuning arm 140 aligned parallel to an edge of the PCB 410. Each of the antennas 450*a-d* is arranged such that the signal input 115 is on an outer edge of the array 400. Additionally, in the mirrored arrangement, each antenna 450*a-d* includes a carrier arm that is connected to a signal input 115 on a first end, to a resonating arm 130 on a second end, and to the capacitive tuning arm 140 at a section between the first end and the second end such that the antennas connected to the same edge of the PCB 410 (e.g., the first antenna 450*a* and the second antenna 450*h* versus the third antenna 450*c* and the fourth antenna 450*d*) are oriented to face and align a second end of the resonating arm 130 (e.g., the end not connected to the carrier arm) both towards and in-line with each other. The second end of the carrier arm (that is connected to the signal input 115) is closer to the edge of the PCB 410 than the first end, and is separated from that edge by a feed gap 160. In the mirrored arrangement, the second end of the carrier arm is oriented to face and be in-line with the second end of the carrier arm of one of the antennas 450*a-d* connected to the opposite edge of the PCB 410 (e.g., the first antenna 450*a* and the third antenna 450*c* versus the second antenna 450*b* and the fourth antenna 450*d*). Additionally, in embodiments that include a resonating extension arm 135, such as the example shown in FIGS. 4A and 4B, the free end of each resonating extension arm 135 (e.g., the end not connected to the resonating arm 130) is oriented to face and be in-line with the free end of the resonating extension arm 135 of the opposing antenna connected to the different edge of the PCB 410 (e.g., the first antenna 450*a* and the third antenna 450*c* versus the second antenna 450*b* and the fourth antenna 450*d*).

Figure 5A:
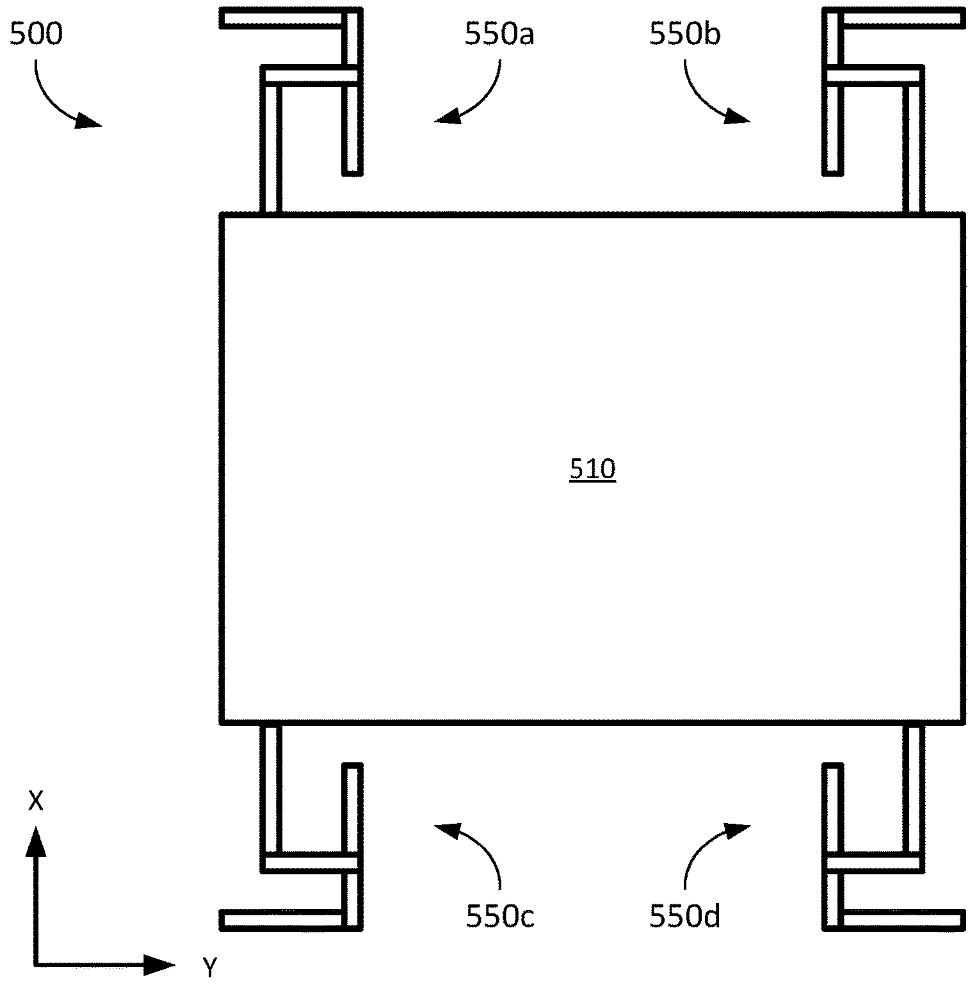
FIGS. 5A and 5B provide planar views of an antenna array with four bent inverted-F antennas, according to embodiments of the present disclosure.
Figure 5B:
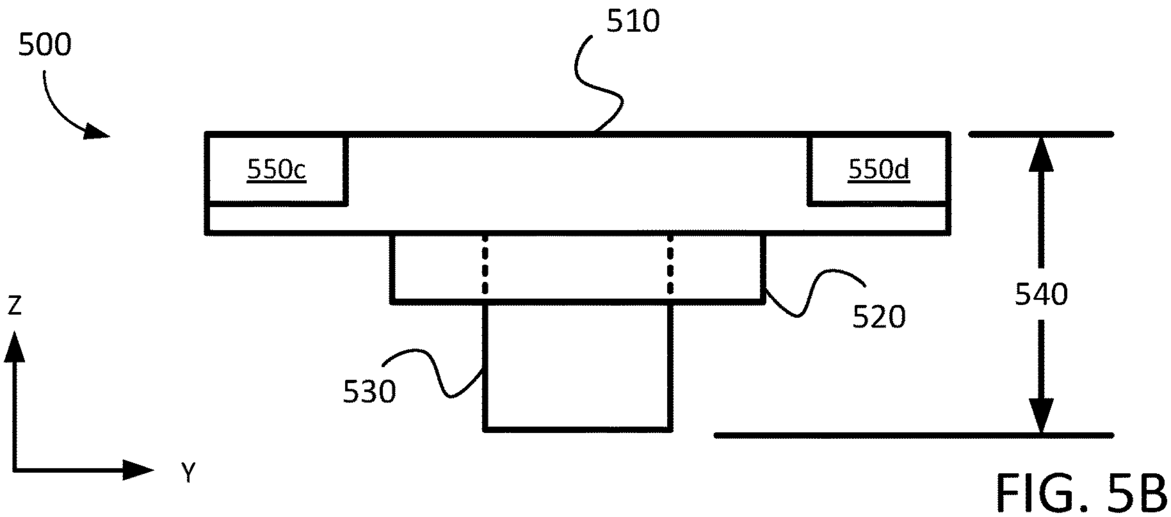

FIGS. 5A and 5B provide planar views of an antenna array 500 with four bent inverted-F antennas 550*a-c*, according to embodiments of the present disclosure. FIG. 5A shows a view in an XY plane, while FIG. 5B shows a view in a ZY plane. Although the antennas 550*a-d* shown in FIGS. 5A and 5B are shown according to the bent IFA design 100 shown in FIG. 1, in various embodiments, the antennas 550*a-d* may also include one or more Chamfered edges, as are shown in the bent IFA design 200 shown in FIG. 2. Each of the antennas 550*a-d* shown in FIGS. 5A and 5B are identical (within manufacturing tolerances) to one another, and are controlled via a printed circuit board (PCB) 510 connected as the ground (155) for the antennas 550*a-d.*

The PCB 510 and antennas 550*a-d* provide a low-profile design, with a total depth 540 that is controlled to allow the array 500 to be readily incorporated into various wireless computing devices for use with various standards of wireless communication. In various embodiments, the antennas 550*a-d* may be incorporated into a shared substrate with the PCB 510, or may extend from the PCB 510 into open space. The PCB 510 includes various electromagnetic shielding 520, and various connectors 530 to connect external power, ground, and control signals to the PCB 510, and secure the PCB 510 in place (in addition to or instead of additional fasteners). In some embodiments, the low-profile design can provide a total depth 540 of less than 4 mm so that the total volume occupied by the array 500 is less than a 27×15×4 mm volume.

The antennas 550*a-d* of the array 500 are provided in a mirrored arrangement around the PCB 510 in which the shorting arm 150 is connected to the PCB 510 on a first end and is connected to a capacitive tuning arm 140 on a second end such that the capacitive tuning arm 140 aligned parallel to an edge of the PCB 510. Each of the antennas 550*a-d* is arranged such that the signal input 115 is interior within the array 500 rather than on the outer edge (cf. FIGS. 3A and 3B). Additionally, in the mirrored arrangement, each antenna 550*a-d* includes a carrier arm that is connected to a signal input 115 on a first end, to a resonating arm 130 on a second end, and to the capacitive tuning arm 140 at a section between the first end and the second end such that the antennas connected to the same edge of the PCB 510 (e.g., the first antenna 550*a* and the second antenna 550*b* versus the third antenna 550*c* and the fourth antenna 550*d*) are oriented to face the free end of the resonating arm 130 (e.g., the end not connected to the carrier arm) both away and in-line with each other. The second end of the carrier arm (that is connected to the signal input 115) is closer to the edge of the PCB 510 than the first end, and is separated from that edge by a feed gap 160. In the mirrored arrangement, the second end of the carrier arm is oriented to face and be in-line with the second end of the carrier arm of one of the antennas 550*a-d* connected to the opposite edge of the PCB 510 (e.g., the first antenna 550*a* and the third antenna 550*c* versus the second antenna 550*b* and the fourth antenna 550*d*).

The arrangement shown in FIG. 5A flips the individual antennas 550*a-d* about the X axis compared to the individual antennas 330*a-d* shown in FIG. 3A, which reduces the distance between the antennas 550*a-d* connected to the same edge of the PCB 510 relative to those shown in FIG. 3A (e.g., the first antenna 550*a* and the second antenna 550*b* versus the third antenna 550*c* and the fourth antenna 550*d*). However, if sufficient space is available between the antennas 550 for signal isolation, the arrangement in FIG. 5A may allow for a more compact design when accounting for routing connections to the signal inputs 115 compared to the arrangement in FIG. 3A.

Figure 6A:
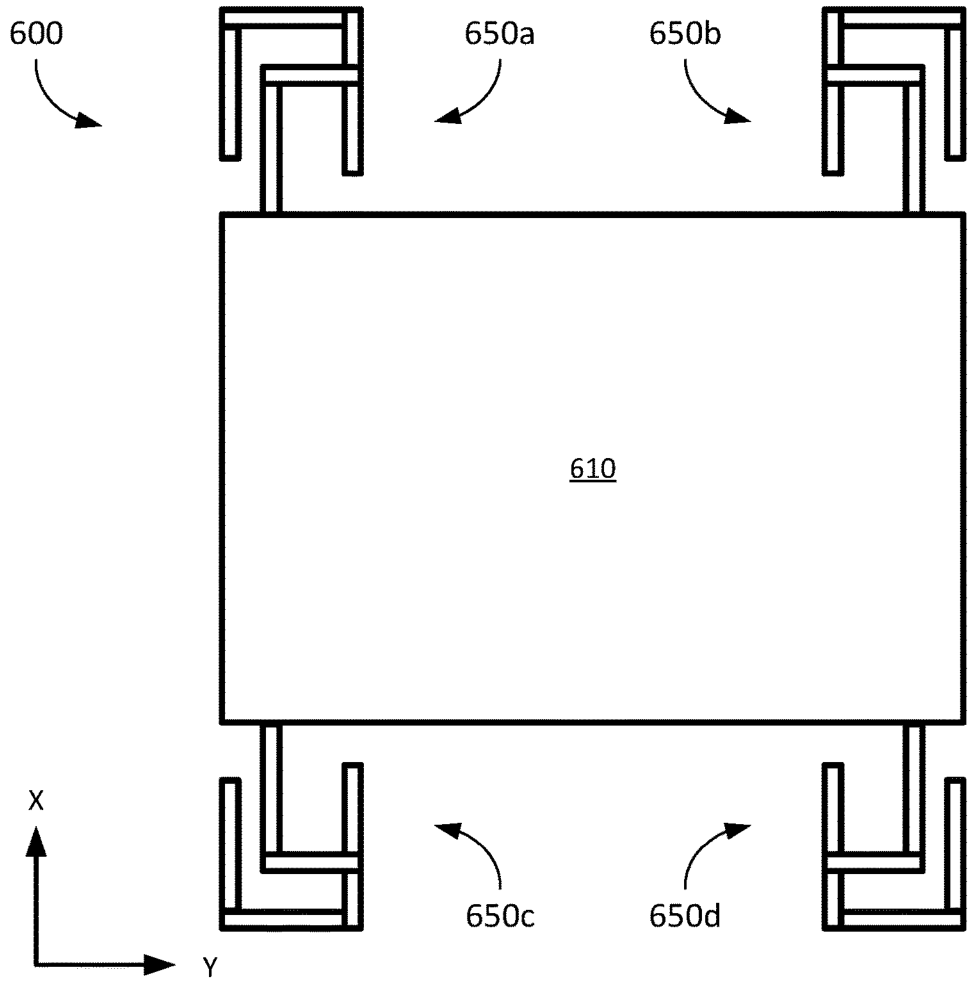
FIGS. 6A and 6B provide planar views of an antenna array with four bent inverted-F antennas with extension arms, according to embodiments of the present disclosure.
Figure 6B:
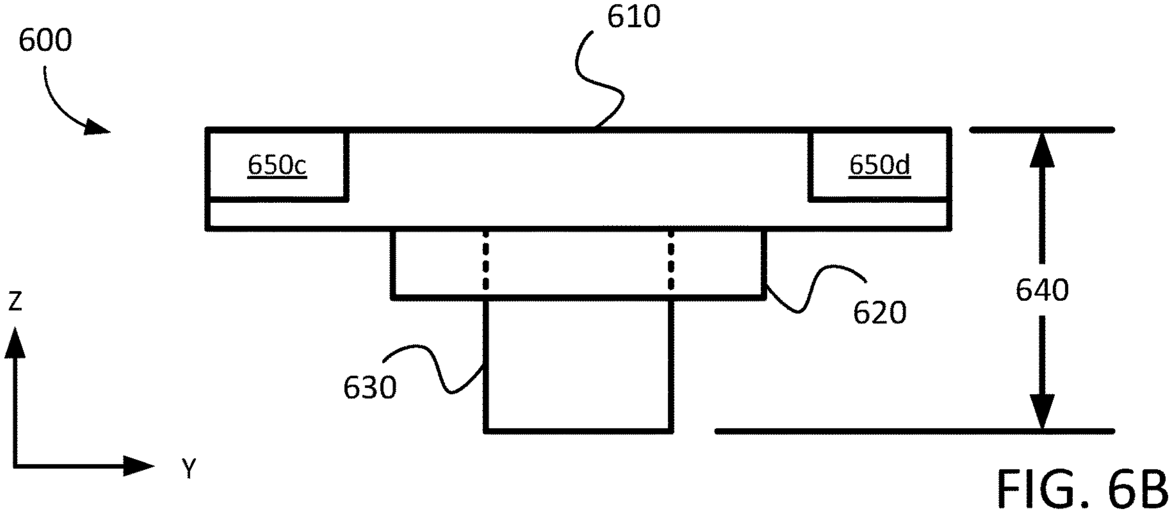

FIGS. 6A and 6B provide planar views of an antenna array 600 with four bent inverted-F antennas 650*a-d* with extension arms, according to embodiments of the present disclosure. FIG. 6A shows a view in an XY plane, while FIG. 6B shows a view in a ZY plane. Although the antennas 650*a-d* shown in FIGS. 3A and 3B are shown according to the bent IFA design 100 shown in FIG. 1, in various embodiments, the antennas 650*a-d* may also include one or more chamfered edges, as are shown in the bent IFA design 200 shown in FIG. 2. Additionally, each of the antennas 650*a-d* shown in FIGS. 6A and 6B are identical (within manufacturing tolerances) to one another, and are controlled via a printed circuit board (PCB) 310 connected as the ground 155 for the antennas 650*a-d*.

The PCB 610 and antennas 650 provide a low-profile design, with a total depth 640 that is controlled to allow the array 600 to be readily incorporated into various wireless computing devices for use with various standards of wireless communication. In various embodiments, the antennas 650*a-d* may be incorporated into a shared substrate with the PCB 610, or may extend from the PCB 610 into open space. The PCB 610 includes various electromagnetic shielding 620, and various connectors 630 to connect external power, ground, and control signals to the PCB 610, and secure the PCB 610 in place (in addition to or instead of additional fasteners). In some embodiments, the low-profile design can provide a total depth 640 of less than 6 mm so that the total volume occupied by the array 600 is less than a 27×1.5×4 mm volume.

The antennas 650*a-d* of the array 600 are provided in a mirrored arrangement around the PCB 610 in which the shorting arm 150 is connected to the PCB 610 on a first end and is connected to a capacitive tuning arm 140 on a second end such that the capacitive tuning arm 140 aligned parallel to an edge of the PCB 610. Each of the antennas 650*a-d* is arranged such that the signal input 115 is interior within the array 600 rather than on the outer edge (cf. FIGS. 3A and 3B), Additionally, in the mirrored arrangement, each antenna 650*a-d* includes a carrier arm that is connected to a signal input 115 on a first end, to a resonating arm 130 on a second end, and to the capacitive tuning arm 140 at a section between the first end and the second end such that the antennas connected to the same edge of the PCB 610 (e.g., the first antenna 650*a* and the second antenna 650*b* versus the third antenna 650*c* and the fourth antenna 650*d*) are oriented to face and align a second end of the resonating arm 130 (e.g., the end not connected to the carrier arm) both away from and in-line with each other. The second end of the carrier arm (that is connected to the signal input 115) is closer to the edge of the PCB 610 than the first end, and is separated from that edge by a feed gap 160. In the mirrored arrangement, the second end of the carrier arm is oriented to face and be in-line with the second end of the carrier arm of one of the antennas 650*a-d* connected to the opposite edge of the PCB 610 (e.g., the first antenna 650*a* and the third antenna 650*c* versus the second antenna 650*b* and the fourth antenna 650*d*). Additionally, in embodiments that include a resonating extension arm 135, such as the example shown in FIGS. 6A and 6B, the free end of each resonating extension arm 135 (e.g., the end not connected to the resonating arm 130) is oriented to face and be in-line with the free end of the resonating extension arm 135 of the opposing antenna connected to the different edge of the PCB 610 (e.g., the first antenna 650*a* and the third antenna 650*c* versus the second antenna 650*h* and the fourth antenna 650*d*).

The arrangement shown in FIG. 6A flips the individual antennas 650*a-d* about the X axis compared to the individual antennas 430*a-d* shown in FIG. 4A, which reduces the distance between the antennas 650*a-d* connected to the same edge of the PCB 610 relative to those shown in FIG. 4A (e.g., the first antenna 650*a* and the second antenna 650*b* versus the third antenna 650*c* and the fourth antenna 650*d*). However, if sufficient space is available between the antennas 650 for signal isolation, the arrangement in FIG. 6A may allow for a more compact design when accounting for routing connections to the signal inputs 115 compared to the arrangement in FIG. 4A.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10?, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An antenna, comprising:

a carrier arm having a first end and a second end;

a resonating arm, connected at the second end of the carrier arm and extending perpendicularly from the carrier arm in a first direction;

a capacitive tuning arm, having a third end and a fourth end, connected at the third end to a portion of the carrier arm between to the first end and the second end, and extending perpendicularly from the carrier arm in the first direction; and a shorting arm, connected at the fourth end of the capacitive tuning arm and extending perpendicularly from the capacitive tuning arm in a second direction, away from the resonating arm.

2. The antenna of claim 1, wherein the second end and the fourth end include chamfered edges.

3. The antenna of claim 1, wherein the resonating arm extends in the first direction past the fourth end of the capacitive tuning arm.

4. The antenna of claim 1, further comprising:

a resonating extension arm, extending in the second direction perpendicularly from a second end of the resonating arm not connected to the carrier arm.

5. The antenna of claim 1, wherein a gap distance in the second direction from the resonating arm to the capacitive tuning arm is tuned for a parasitic capacitance in the antenna.

6. The antenna of claim 1, wherein a length of the resonating arm is tuned for at least one of transmission or reception of signals with frequencies between 6.2 Gigahertz (GHz) and 9 GHz.

7. The antenna of claim 1, wherein an area occupied by the antenna is less than 3.1 millimeters (mm) by 3.8 mm.

8. An antenna, comprising:

a resonating arm having a first end and a second end, opposite to the first end, and wherein the resonating arm is aligned in a first direction;

a capacitive tuning arm configured to impart a parasitic capacitance in the antenna, wherein the capacitive tuning arm has a first end and a second end, opposite to the first end, and wherein the capacitive tuning arm is aligned in the first direction at a gap distance from the resonating arm;

a gap arm aligned in a second direction perpendicular to the first direction, wherein the gap atm is connected to the second end of the resonating arm and to the second end of the capacitive tuning arm;

an signal arm aligned in the second direction, wherein the signal arm has a first end and a second end, opposite to the first end, and Wherein the second end of the signal arm is connected to the second end of the capacitive tuning arm and the first end of the input arm is connected to a signal input; and a shorting arm aligned in the second direction, wherein the shorting arm has a first end and a second end, opposite to the first end, and wherein the first end of the shorting arm is connected to the first end of the capacitive tuning arm and the second end of the shorting arm is connected to a ground.

9. The antenna of claim 8, wherein the second end of the resonating arm and the second end of the capacitive tuning arm include chamfered edges.

10. The antenna of claim 8, wherein the first end of the resonating arm extends in the first direction past the first end of the capacitive tuning arm.

11. The antenna of claim 10, further comprising:

a resonating extension arm, aligned in the second direction from the first end of the resonating arm, wherein a combined length of the resonating extension arm and the resonating arm is tuned to send or receive ultra wideband (UWB) signals.

12. The antenna of claim 8, wherein the gap distance is tuned for a parasitic capacitance in the antenna.

13. The antenna of claim 8, wherein a length of the resonating arm is tuned to send or receive ultra wideband (UWB) signals.

14. The antenna of claim 8, wherein an area occupied by the antenna is less than 3.1 millimeters (mm) by 3.8 mm.

15. An antenna array, comprising:

a printed circuit board (PCB); and a plurality of bent inverted-F antennas connected to the PCB, wherein each bent inverted-F antenna of the plurality of bent inverted-F antennas comprises:

a shorting arm connected to the PCB on a first end and a capacitive tuning arm on a second end, the capacitive tuning arm aligned parallel to an edge of the PCB; and a carrier arm connected to a signal input on a first end, to a resonating arm on a second end, and to the capacitive tuning arm at a section between the first end and the second end.

16. The antenna array of claim 15, wherein each bent inverted-F antenna of the plurality of bent inverted-F antennas further comprises:

a feed gap between the edge of the PCB and the second end of the carrier arm.

17. The antenna array of claim 15, wherein a length of the resonating arm of each bent inverted-F antenna of the plurality of bent inverted-F antennas is tuned for at least one of transmission or reception of signals with frequencies between 6.2 Gigahertz (GHz) and 9 GHz.

18. The antenna array of claim 15, wherein:

the plurality of bent inverted-F antennas further comprises four bent inverted-F antennas;

a first pair of the four bent inverted-F antennas are disposed on a first edge of the PCB and a second pair of the four bent inverted-F antennas are disposed on a second edge of the PCB, opposite to the first edge; and a free end of the resonating arm of each bent inverted-F antenna of the plurality of bent inverted-F antennas faces the free end of the resonating arm of one other bent inverted-F antenna of the plurality of bent inverted-F antennas.

19. The antenna array of claim 15, wherein each bent inverted-F antenna of the plurality of bent inverted-F antennas further comprises:

a resonating extension arm connected to an opposite end of the resonating arm from where the resonating arm is connected to the carrier arm, wherein the resonating extension arm extend from the resonating arm towards the edge of the PCB.

20. The antenna array of claim 15, wherein each bent inverted-F antenna of the plurality of bent inverted-F antennas is tuned for signal reception or transmission according to a length of the resonating arm and a gap distance between the resonating arm and the capacitive tuning arm.

* * * * *